UNITED STATES PATENT OFFICE.

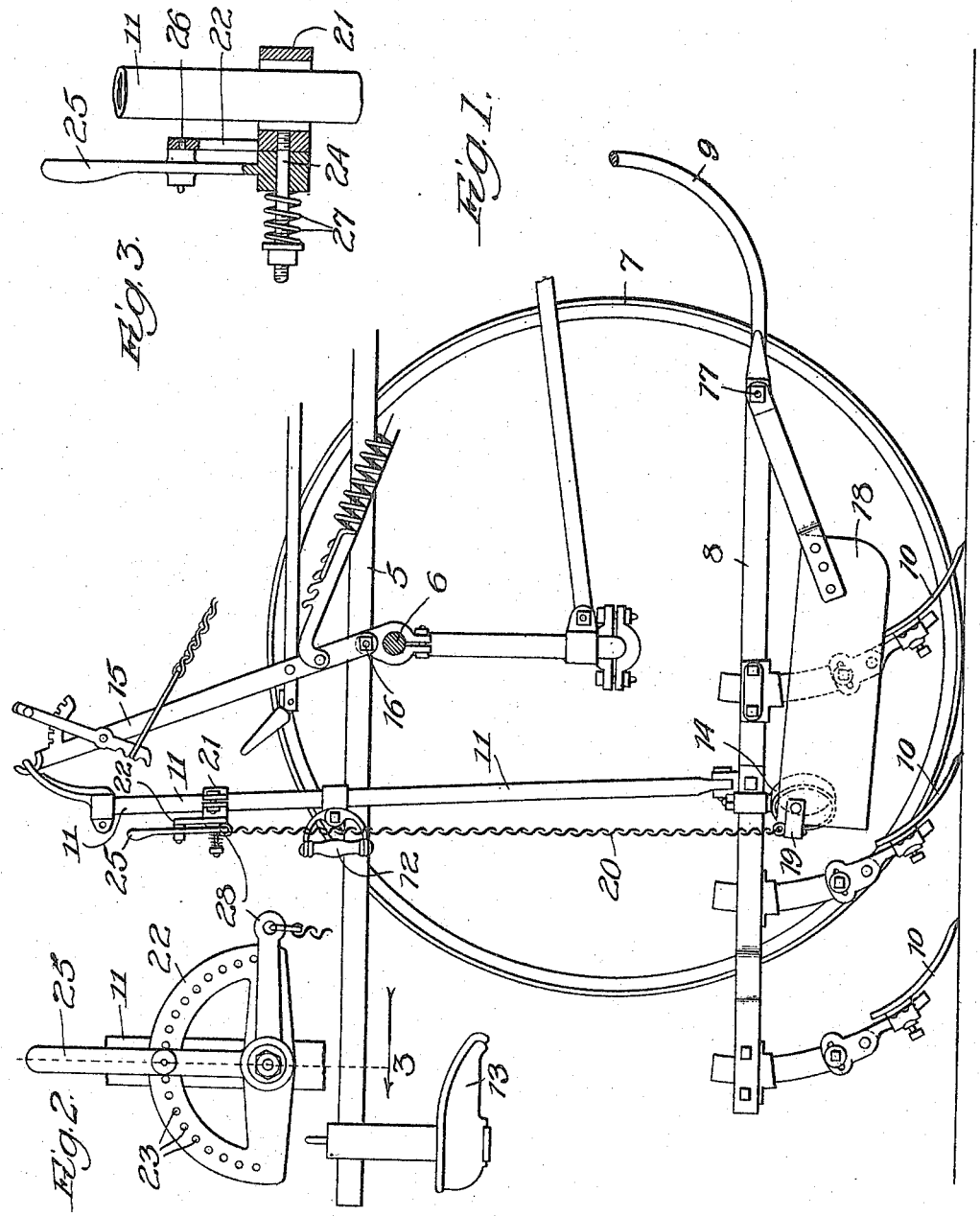

CARL E. BENGTSON, OF PAXTON, ILLINOIS.

CULTIVATOR.

1,188,032. Specification of Letters Patent. Patented June 20, 1916.

Application filed February 7, 1914. Serial No. 817,345.

*To all whom it may concern:*

Be it known that I, CARL E. BENGTSON, a citizen of the United States, residing at Paxton, in the county of Ford and State of Illinois, have invented a new and useful Improvement in Cultivators, of which the following is a specification.

My invention relates, more particularly, to the fender, or guard, attachments commonly provided on cultivators for regulating the height to which the soil thrown up by the shovels of the cultivator, is heaped about the plants being cultivated; and my object is to provide a fender which may be readily adjusted while the cultivator is operating for varying its vertical position relative to the shovels, and the adjustment of which, relative to the shovels, will not be disturbed upon raising or lowering the rig, or beam, carrying the shovels with which it coöperates, and which will readily yield upwardly when it rides upon a clod of earth or other relatively hard mass of material.

Referring to the accompanying drawings—Figure 1 is a view in longitudinal sectional elevation of a cultivator of a well known type equipped with my improved fender means; Fig. 2 is an enlarged view in elevation of the adjusting means for each fender; and Fig. 3, a similar view of the mechanism of Fig. 2 viewed at a right angle thereto.

The cultivator shown and in connection with which I have chosen to illustrate my invention is of a well-known type employing a main frame 5, supported on a yoke-axle 6, on which the wheels 7 one only of which is shown of the cultivator are journaled, and to which frame the tongue (not shown) of the cultivator is secured; a pair of rigs, or beams, 8 one only of which is shown having upwardly-turned forward ends 9 (shown broken away) which in this type of cultivator are swiveled in a vertical plane on a rock-shaft (not shown) supported from the main-frame 5, to permit them to be swung up and down and rocked laterally independently of each other on the main frame, these rigs carrying the shovels 10. Each rig 8 is provided with an upright bar 11 having a handle grip 12 within easy reach of the operator seated on the seat 13, and each rig has a stirrup 14 for a foot of the operator, through the medium of either of which (the handle-grips 12 or stirrups 14) the operator may swing the rigs laterally to guide them in the operation of the machine. The upper ends of the uprights 11 hook over the recessed upper ends of levers 15 pivoted at 16 on the axle 6 which, together with other parts represented as connected therewith, control the raising and lowering of the rigs 8 in a manner well known and therefore not requiring description.

My improved fender means for each rig 8 comprises a bar pivoted at one end, as indicated at 17, to the rig and rigidly connected at its opposite end with a blade 18, forming the fender-proper, one of each of which is located on the inner side of the shovel devices 10 with which it coöperates. The rear end of each fender 18 is connected by a clip 19, with the lower end of a chain, or the like, 20, the upper end of which is connected with an adjusting device on the adjacent upright 11 for varying the height at which the fender 18 extends relative to the shovels 10 with which it coöperates, the preferred form of adjusting means employed comprising a head 21 secured to the upright 11, and carrying a quadrant 22 containing openings 23, a pin 24 extending laterally from the head 21 on which a lever 25 containing a pin 26 adapted to enter any one of the openings 23, is journaled, this lever being backed up by a coil-spring 27 which yields to permit the lever to be disengaged at its pin 26 from the opening 23 for readjustment thereof along the quadrant 22, this lever having an arm 28 to which the upper end of the chain 20 is secured, whereby upon turning the lever 25 on its journal 24 the fender 18 will be raised or lowered relative to the shovels 10 depending on the direction in which it is turned.

It will be readily understood from the foregoing that the raising and lowering of the rigs will not disturb the adjustment of the fenders relative thereto and that each fender is independently vertically adjustable relative to the shovels 10 with which it coöperates. Furthermore, the fenders are free to rise at their rear ends which is an advantage when the fenders ride upon clods of earth or other masses of hard material which, if the fenders were rigid, would impair them. Another advantage lies in the fact that the adjusting means for the fenders are within easy reach of the operator and permit the fenders to be raised and lowered at will relative to the shovels 10.

While I have illustrated a particular construction embodying my invention, I do not wish to be understood as intending to limit it thereto as the same may be variously modified and altered without departing from the spirit of my invention, it being my desire to claim my invention as fully and broadly as the prior state of the art will permit.

What I claim as new and desire to secure by Letters Patent is—

1. A pair of fenders for attachment to a wheel cultivator having substantially horizontally disposed vertically adjustable rigs provided with cultivating means, said fenders being mounted at their forward ends on said rigs, separate means carried by the rigs and flexibly connected with the fenders adapted to hold the fenders in independent vertically adjusted position relative to the cultivating means carried by the rigs and movable bodily with the rigs when the rigs are adjusted.

2. A pair of fenders adapted for attachment to a wheel cultivator having vertically adjustable rigs provided with cultivating means and uprights projecting from the central parts of the rigs, said fenders being pivotally supported at their forward ends on the forward portions of said rigs and connected independently of each other near their rear ends to said uprights, and separate adjusting means carried by said uprights and flexibly connected with said fenders adapted to permit vertical adjustment of the fenders with relation to the rigs.

3. A pair of independent fenders adapted for attachment to a wheel cultivator having vertically adjustable rigs provided with cultivating means and uprights projecting from the central parts of the rigs, said fenders being pivotally supported at their forward ends on the forward portions of said rigs and connected independently near their rear ends to said vertical members, independent adjusting means carried by said uprights and flexible connections between said fenders and adjusting means adapted to permit vertical adjustment of the fenders with relation to the rigs, whereby the rigs and fenders may be moved together or independently of each other.

CARL E. BENGTSON.

In presence of—
D. C. Thorsen,
O. C. Avisus.

Copies of this patent may be obtained for five cents each, by addressing the "Commissioner of Patents, Washington, D. C."